United States Patent [19]

Harada et al.

[11] Patent Number: 4,600,323

[45] Date of Patent: Jul. 15, 1986

[54] PRINTING HEAD ASSEMBLY

[75] Inventors: Mineo Harada, Owariasahi; Tetsuji Shimojo, Woariasahi; Kaname Furuya, Kasugai, all of Japan

[73] Assignee: Hitachi, Ltd., Tokyo, Japan

[21] Appl. No.: 690,270

[22] Filed: Jan. 10, 1985

[30] Foreign Application Priority Data

Jan. 25, 1984 [JP] Japan .............................. 59-10018

[51] Int. Cl.4 .......................... B41J 3/12; C04B 35/04

[52] U.S. Cl. ................................ 400/124; 101/93.05; 400/694; 335/303; 252/62.53

[58] Field of Search .............................. 400/124, 694; 101/93.05; 156/272.4; 252/62.53, 62.54; 335/303

[56] References Cited

U.S. PATENT DOCUMENTS

| | | | |
|---|---|---|---|
| 3,808,135 | 4/1974 | Weigel | 252/62.54 |
| 3,896,918 | 7/1975 | Schneider | 400/124 |
| 4,044,668 | 8/1977 | Barrus | 400/124 X |
| 4,225,250 | 9/1980 | Wagner | 400/124 |
| 4,412,929 | 11/1983 | Lysenko | 252/62.54 X |
| 4,423,969 | 1/1984 | Kobryn | 101/93.05 X |
| 4,427,481 | 1/1984 | Smith | 252/62.54 X |
| 4,493,567 | 1/1985 | Tada | 400/124 |
| 4,498,791 | 2/1985 | Gilbert | 400/124 |
| 4,511,269 | 4/1985 | Takahashi | 400/124 |

*Primary Examiner*—Paul T. Sewell
*Attorney, Agent, or Firm*—Beall Law Offices

[57] ABSTRACT

A printing head assembly having a permanent magnet to attract magnetic members such as armatures to store the strain energy in resilient members such as leaf springs, electro-magnets to cancel the magnetic flux generated by the permanent magnets in order to drive the magnetic members, first yokes related to cores of the electro-magnets, and second yokes forming surfaces by the permanent magnet and serving to form fulcrums of rotation of the magnetic members. The permanent magnet is mounted on the first yoke and the second yoke is mounted on the permanent magnet respectively. In order to equalize attracting force by the permanent magnet among a plurality of armature actuating mechanisms and to adjust the height of the surface of the second yoke, with a predetermined height, there is applied a powdery magnetic material mixed into a bonding agent on at least one side of the permanent magnet. This bonding layer can also absorb some errors caused by the production of the first and second yokes and the permanent magnet.

14 Claims, 6 Drawing Figures

PRINTING HEAD ASSEMBLY

BACKGROUND OF THE INVENTION

This invention relates to a printing head assembly and, more particularly, to a printing assembly of a wire matrix printer and process for producing the same.

One type of wire styli matrix printing head used in a serial type printer is what may be called "cancellation type" or "stored energy method" shown in, for example, the specifications of U.S. Pat. Nos. 4,044,668 and 4,225,250. This type of printing head is superior to other ones, i.e., the clapper method, in that the heat generation by electro-magnets during printing is small and that a large attracting force can be obtained even by permanent magnets of a small size. The wire matrix printing head of the cancellation type, therefore, is suited to practical use.

Various efforts have been made to obtain higher printing speed to fill user needs.

SUMMARY OF THE INVENTION

The assignee has already proposed, in the specification of U.S. patent application Ser. No. 480,788 filed Mar. 31, 1983, a printing head improved mainly by the minimization of the distance between the point of action and the fulcrum, thereby attaining a high printing speed.

In a printing head of the cancellation type, the resiliency of a resilient member directly actuates a printing wire for printing. This means that the quality of the print is largely affected by factors such as the resilient force exerted by the resilient members. If the resilient force related to a certain printing wire is changed, printing energy actuating the printing wire would change, the worst case being a lack of printing energy. In addition, if there are various resilient forces among a plurality of resilient members related to a plurality of wire styli, they cause variations in the timing of the actuating of the wire styli. Accordingly, it is desirable to equalize the resilient force of the resilient members among a plurality of resilient members.

The above equalization of the resilient force is related to the equalization of the attracting force by the permanent magnets. Even if the resilient force of the resilient members is equalized, the variations of the attracting force by the permanent magnet cause the variations of the timing of actuating the resilient members. Accordingly, it is important to equalize the attracting force by the permanent magnet to drive magnetic members such as armatures among a plurality of armature actuating mechanisms.

It is an object of the present invention to provide a printing head assembly to equalize attracting force by a permanent magnet to a plurality of armatures without magnetic flux leaking.

It is another object of the invention to provide a printing head assembly in which height can be adjusted with a predetermined height among a plurality of armature actuating mechanisms.

It is another object of the invention to provide the armature actuating mechanism in which a bonding agent mixed with powdery magnetic material therein is applied between a permanent magnet and yokes in order to prevent magnetic flux from leaking and to adjust the height.

The present invention realizes in a wire matrix printing head assembly having a plurality of magnetic members, such as armatures, to drive printing elements, respectively, a plurality of resilient members fixed at one end to one end of the magnetic members, a permanent magnet to attract the magnetic members to store the strain energy in the resilient members, a first magnetic member as a first yoke having a plurality of cores to form electro-magnets to cancel the magnetic flux generated by the permanent magnet in order to drive the magnetic member selectively, and a second magnetic member as a second yoke forming a magnetic surface to pass through the magnetic flux generated by the permanent magnets to the magnetic members and serving to form fulcrums of rotation for the magnetic members thereon.

In the above arrangement, the equalization of the attracting force by the permanent magnet among a plurality of armature actuating mechanisms does mean the equalization of the amount of the magnetic flux from the permanent magnet. In order to supply the magnetic flux generated from the permanent magnet to the first yoke and the second yoke without leaking, a magnetic material layer is applied to at least one side between the permanent magnet and the first or second yoke. In addition, the height of the magnetic material layer for applying is controlled so as to cause the magnetic surface of the first yoke to be a predetermined height.

According to a preferred embodiment, powdery magnetic material is mixed into a bonding agent, and this powdery magnetic material is applied to both sides of the permanent magnet and to the first and the second yokes to bond them together. To construct the printing assembly, the permanent magnet and the first and second yokes are arranged in a predetermined structure, and the bonding agent is mixed and applied between the permanent magnet and the first and second yokes. Then the assembly is pressed until the bond hardens so that the first surface of the first yoke and the second surface of the second yoke reach the predetermined relation, for instance, the same height or the other yokes of the other actuating mechanisms for the printing head assembly. It is easy to adjust the height of the surface of the yokes to be uniform by controlling the thickness of the bonding layers.

Therefore, even if there are some errors resulting from the production thereof among the permanent magnet, the first yoke and the second yoke, these errors can be absorbed in the bonding layers.

DESCRIPTION OF THE PREFERRED EMBODIMENTS

Figure 1:
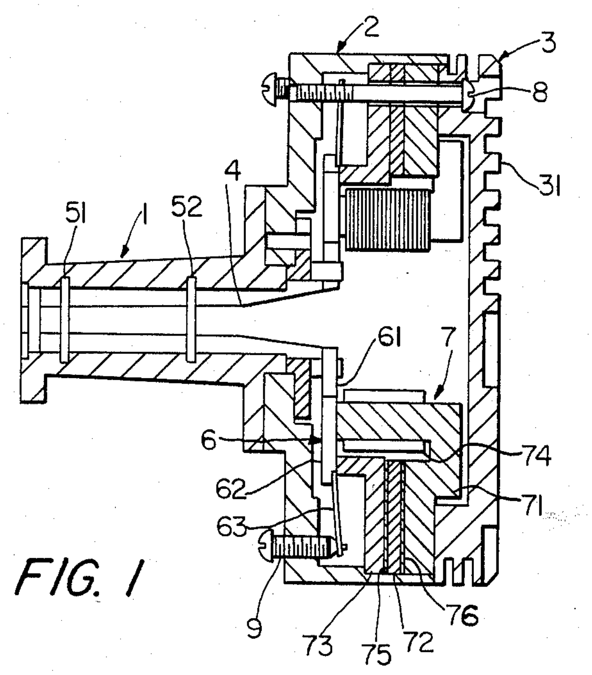
FIG. 1 is a sectional side elevational view of a wire styli matrix print head embodying the present invention.
Figure 2:
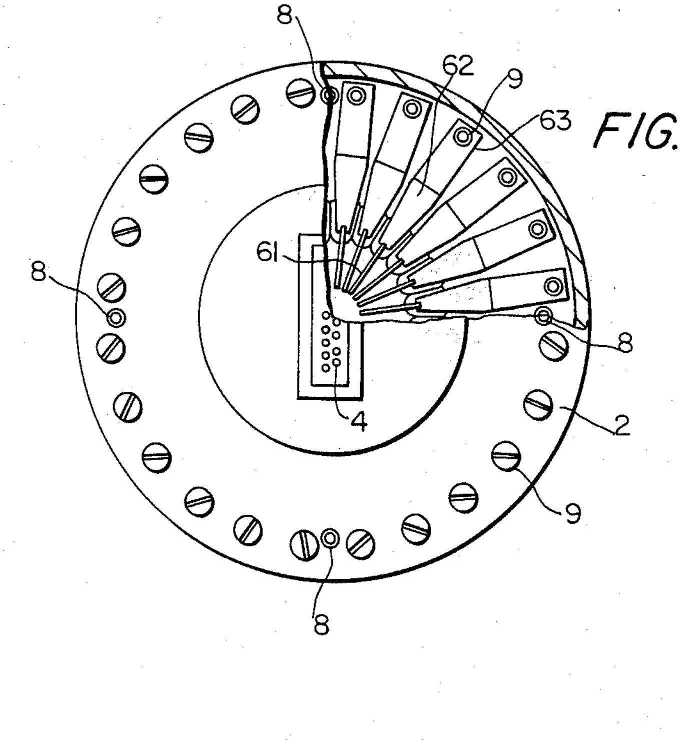
FIG. 2 is a partly cut-away front elevational view of the print head shown in FIG. 1, as viewed from the left side in FIG. 1.

FIGS. 1 and 2 are a sectional side elevational view and a front elevational view of a wire styli matrix print head having 24 wire styli embodying the present invention. Referring to these figures, the print head has an outer frame composed of a nose frame 1, housing frame 2 and an outer plate 3. The nose frame 1 has guides 51 and 52 to guide 24 wire styli in a predetermined manner. These guides 51 and 52 are provided with through bores for guiding respective wire styli 4 so as to form two rows at the end of the print head. The outer plate 3 is made from a metallic material such as aluminum, and is provided with a heat sink 31 for externally radiating the heat produced in the print head. The following printing mechanism is mounted in the space defined by the housing frame 2 and the outer plate 3.

Twenty-four combinations of the lever unit 6 and the actuating mechanism 7 are arranged within a housing frame 2 such that the wire styli are directed radially inwardly towards the center of the print head, and fixed by a plurality of bolts 8 through the outer plate 3.

The lever unit 6 is composed of a lever member 61, a magnetic member 62 and a spring member 63 in the form of a leaf spring. A wire stylus 4 is fixed to the end of the lever member 61 by brazing, for example. The lever member 61 is fixed to one end of the magnetic member 62 by brazing. The spring member 63 having a predetermined resiliency is fixed to the other end of the magnetic member 62 by brazing.

The twenty-four lever units 6 thus constructed are density arranged with the associated wire styli disposed radially inwardly towards the center. Each rear end of the spring 63 is engaged with a screw 9 through a hole 630 (shown in FIG. 3); the spring force of the spring 63 can be adjsuted by the rotation of the screw 9.

Next an explanation will be given hereinbelow as to the mechanism for actuating the above lever unit 6 by referring in detail in FIG. 3. The advantage of the present invention can be obtained mainly by construction of the mechanism as follows.

Yoke 71 of the actuating mechanism 7 has a specific L-shaped configuration forming a core 712 integrally therewith. A coil 74 is wound round the core 712 so that the coil 74 and the core portion 712 in combination constitute an electro-magnet. Magnetic flux generated by the electro-magnet passes through the magnetic surface 711 to cancel the magnetic flux of a permanent magnet 72. The permanent magnet 72 is mounted on one side of the yoke 71. There is a yoke 73 mounted on the permanent magnet 72. The permanent magnet 72 attracts the magnetic member 62 to the yoke 73 and the core 712 by the magnetic flux produced thereby in a normal state.

Since the magnetic member 62 contacts a surface 711 of the core 712 and a surface 731 of the yoke 73, and additionally a corner 622 of the magnetic member 62 makes contact with the surface 731 of the yoke 73, so as to form a fulcrum for rotation of the magnetic member 62, the surfaces 711 and 731 tend to wear. There are preferably coated plating layers 713 and 732 formed by a chemical nickel plating on one end surface of the yokes 71 and 73 for wear resistance. Accordingly, the above surfaces 711 and 731 are formed on the plating layers 713 and 732.

The present invention provides a construction to adjust the height of each of the surfaces 731 of the yokes 73 to be for all actuating mechanisms of the printer, and most preferably the same as the height of the surfaces 711 of the cores 712 without leaking flux as follows.

A bonding layer 75 is formed between the permanent magnet 72 and the yoke 73, and a bonding layer 76 is formed between the yoke 71 and the permanent magnet 72. In other words, the yoke 71, the permanent magnet 72 and the yoke 73 are fixed by the bonding layers 75 and 76.

The material of the bonding agent is a thermoharden-ing epoxy bonding agent, for instance. Additionally, powdery soft magnetic material, for instane, one selected from high pure atomized iron powder, silicon steel, iron nickel alloy and iron cobalt alloy is mixed, for instance, kneaded into the bonding agent. These soft magnetic layers 75 and 76 have magnetic resistance characteristics that are preferably the same as the yokes 71 and 73. Accordingly, the magnetic flux generated from the permanent magnet 72 is transferred to the yokes 71 and 73 without leaking flux. The force of the permanent magnet 72 constantly attracts the magnetic member 62.

On the other hand, even if the bonding agent does not include the above soft magnetic material therein, the assembly can only be constructed so that the surface 731 of the yoke 73 is the same height as the surface 711 of the core 712. However, the magnetic flux generated by the permanent magnet 72 leaks out from the bonding layers 75 and 76 and the force attracting the magnetic member 62 decreases because the bonding layers 75 and 76 work as air gaps to a magnetic circuit formed by the yokes 71 and 73. Further, the height of such air gap would vary among the actuating mechanisms to correspondingly vary the flux available to the members 62 and thus vary the timing.

Accordingly, it is understood that the soft magnetic material in the bonding layers 75 and 76 prevents the magnetic flux from leaking.

Figure 4:
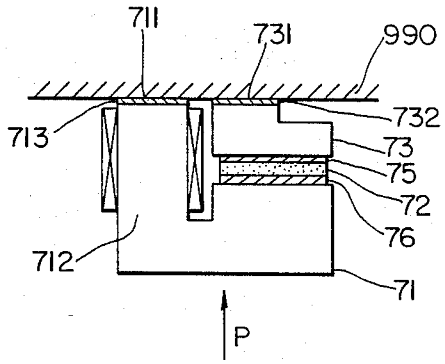
FIG. 4 is a side elevational view showing assembly of a mechanism for actuating the lever shown in FIG. 3.

The following is an explanation of the process for assembling the above construction with reference to FIG. 4.

First, a jig 990 having a flat surface is proposed. The yoke 71, 73 and the permanent magnet 72 formed in predetermined shapes are also prepared. The plating layers 732 and 713 are previously formed on the end surfaces of the yokes 71 and 73. Next, the permanent magnet 72 is mounted on the other end of the yoke 71, and the yoke 73 is mounted on the permanent magnet 72. In this case, the bonding agent including the soft magnetic material is previously pasted on the surface of the yoke 71, 73 and the permanent magnet 72, or injected between them after the above assembly. Then, the surfaces 711 and 731 engage the surface of the jig 990. Predetermined pressure P is given to the assembly so as to press the assembly toward the surface of the jig 990 until the bonding agent hardens.

A plurality of the actuating mechanisms assembled while managing their height, as above mentioned, are arranged relative to the lever unit 6 in the housing frame 2 to construct a wire matrix print head.

The thickness t4 of the bonding layer 75 and the thickness t5 of the bonding layer 76 are selected so that the height of the surface 731 of the actuating mechanism can be managed according to the jig 990. In addition, according to the present invention, these bonding layers 75 and 76 can absorb errors caused by the production of the yokes 71, 73 and the permanent magnet 72, and the variations in the plating layers 713 and 732.

Figure 3:
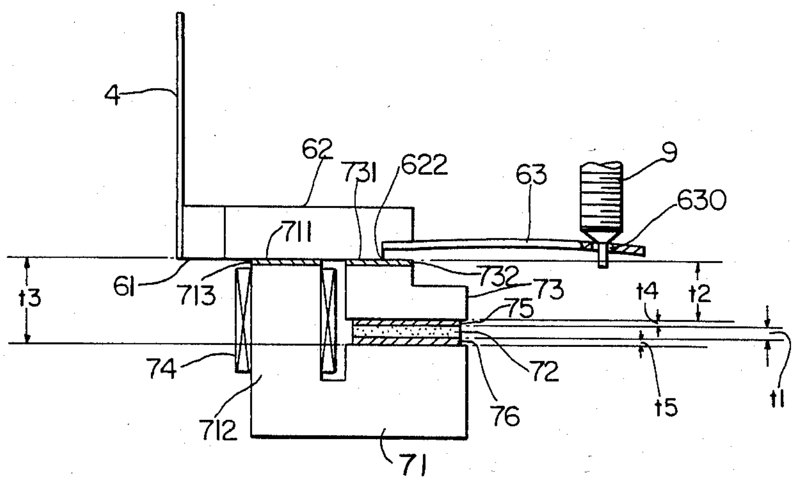
FIG. 3 is a side elevational view showing a lever and a mechanism for actuating the lever.

As shown in FIG. 3, if the height of the yoke 73 (includes the thickness of the plating layer 732) is indicated as t2, the height of the yoke 71 as t3 and the thickness of the permanent magnet 72 as t1, these parts 71, 73 and 72 may be produced by satisfying the following formula:

$$t3 > t1 + t2$$

Then the surfaces 711 and 731 can be at the same height by controlling the thickness of the bonding layers 75 and 76.

As far as each part 71, 72 and 73 satisfies the above formula, it is unnecessary to manage precisely the height of each part 71, 72 and 73 during their production. This management reduces their production cost.

If the surface 711 becomes higher than the surface 731 because of the heat expansion of the core 712, the magnetic member 62 hits first of all the corner 714 of the core 712 when the magnetic member 62 returns to an initial state after the wire stylus 4 impacts the paper. This causes the wear of the corner 714 and the variations of the wear among a plurality of armature actuating mechanism cause the variations of timing to drive armatures.

Figure 5:
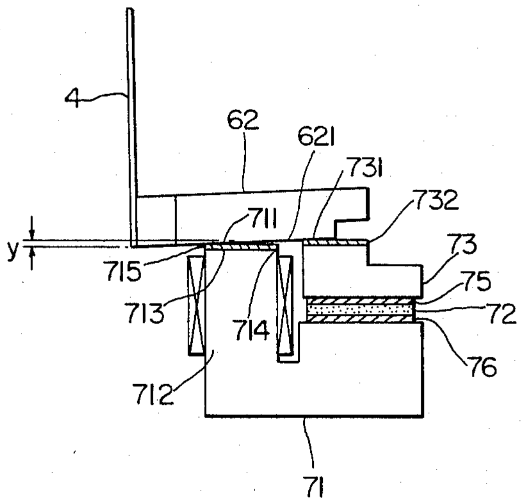
FIG. 5 is a fragmentary side elevational view showing a lever and a mechanism for actuating the lever in another embodiment.
Figure 6:
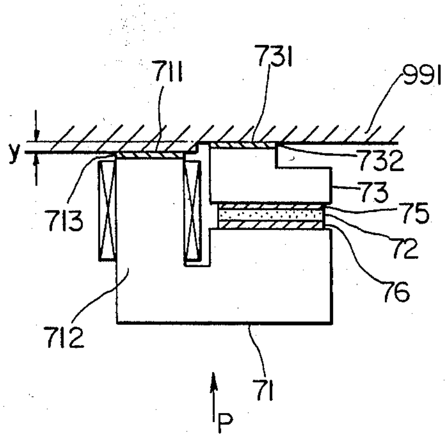
FIG. 6 is a side elevational view showing assembly of the mechanism shown in FIG. 5.

FIG. 5 shows a modification of the preferred embodiment described hereinbelow for preventing above hitting. The difference from the preferred embodiment above mentioned is as follows. An assembly is constructed so that the surface 731 of the yoke 73 is higher than the surface 711 of the core 712 with a difference y by adjusting the thickness of the bonding layers 75 and 76. In this case, a jig 991 having the difference y shown FIG. 6 is used for producing the same.

According to this modification, even if the core 712 is expanded by heat generated in the electro-magnet, since the surface 711 does not become higher than the surface 731, a surface 621 of the magnetic member 62 is prevented from hitting a corner 714 of the core 712 and the resulting wear thereof is prevented. There might be some possibilities to engage with another corner 715 during returning of the magnetic member 62. However, the force causing engagement with corner 715 is smaller than the force hitting the corner 714 in the above case because one end of the magnetic member 62 is attracted by the permanent magnet 72. Therefore, the resulting wear of the corner 715 is almost small.

Various changes and modifications can be made in the present invention. For instance according to the preferred embodiment, the plating layers 713 and 732 are formed on the end surfaces of the yoke 71, such as core 712, and the yoke 73 to prevent wearing. However, if the yoke 71 and 73 are composed of material having wear resistance properties, the plating layers 713 and 732 are not needed.

As another modification, the core 712 is not composed of the yoke 71 as a whole. If cores are formed separate from the first yoke, the first yoke needs magnetic connection to the cores.

In addition, the bonding layer is formed on at least one side of the permanent magnet. To fix the permanant magnet and a yoke, the yokes and the permanent magnet are bonded as a single unit after adjusting the height of the magnetic surface of the yoke.

The shapes of the yokes, the core and the armature, such as a magnetic member, are not limited to the above embodiment. For instance, the first yoke and a plurality of cores are formed by a unitary magnetic member. The permanent magnet can be formed as a unitary ring magnet.

The present invention can be adapted to not only the wire styli matrix print head but also an armature actuating mechanism of the cancellation type in other printers.

I claim:

1. An armature actuating mechanism, comprising:

(a) an armature;

(b) a resilient member fixed to one end of said armature;

(c) a permanent magnet for attracting said armature while resiliently deflecting said resilient member;

(d) an electro-magnet including a core having a magnetic surface facing the armature and coils wound around the core and adapted to cancel the attracting force produced by said permanent magnet;

(e) first magnetic member connected magnetically to said core of the electro-magnet;

(f) second magnetic member located adjacent to said permanent magnet and having a magnetic surface facing the armature;

(g) a first magnetic bonding material layer between one side of said permanent magnet and said first magnetic member;

(h) a second magnetic bonding material layer between the other side of said permanent magnet and said second magnetic member; and (i) said magnetic material layer including mixed magnetic particulate material and bonding means for bonding said permanent magnet to said first and second magnetic members.

2. The armature actuating mechanism according to claim 1, wherein said magnetic material is a powder selected from the group consisting of iron, silicon steel, iron nickel alloy and iron cobalt alloy.

3. The armature actuating mechanism according to claim 1, wherein the magnetic surface of the core and the magnetic surface of the second magnetic member are the same height.

4. The armature actuating mechanism according to claim 1, wherein the magnetic surface of the core facing the armature is lower than the height of the magnetic surface of the second magnetic member.

5. The armature actuating mechanism according to claim 1, further comprising:

a first wear resistant layer formed on a surface of the core facing said armature, said layer being harder than the core; and a second wear resistant layer formed on a surface of the second magnetic member facing said armature, said layer being harder than the second magnetic member.

6. The armature actuating mechanism according to claim 1, wherein said first magnetic member and the core are formed by the same magnetic member.

7. A printing head assembly having printing elements, comprising:

(a) a plurality of magnetic members arranged in predetermined locations corresponding to and for driving the printing elements, respectively;

(b) resilient means respectively connected to one end of said magnetic members for deflecting said magnetic members;

(c) permanent magnet means for attracting said plurality of magnetic members while resiliently deflecting said resilient means;

(d) first yoke means having one end located adjacent to said permanent magnet means and having a plurality of core portions at the other end;

(e) electro-magnet means having coils around said core portions corresponding in number to said magnetic members, for canceling respectively the attracting force produced by said permanent magnet means to selectively actuate the related magnetic member by the resilient force of the resilient means, when actuated;

(f) second yoke means mounted to have one end adjacent to said permanent magnet means and another end in contact with one end of each of said magnetic members; and (g) bonding means including magnetic particulate material therein for bonding said one end of said first yoke means to one side of said permanent magnet means, and for bonding the other side of said permanent magnet means to said one end of said second yoke means.

8. The printing head assembly according to claim 7, wherein the end of the core portions facing said magnetic members is the same height as said another end of said second yoke means facing said magnetic members.

9. Apparatus according to claim 8, wherein there are a plurality of said printing head assemblies;

the dimensions, as taken in a direction parallel to the movement of the armature as produced by said magnet means and said resilient means, being different among the plurality of said permanent magnet means and among said second yoke means of the plurality of printing head assemblies, and the corresponding dimensions of said bonding means being different from each other an amount to compensate for the first mentioned different dimensions so as to obtain a more arcuate predetermined height for said first and second yoke means relative to said armature, for each assembly, than could be obtained if said bonding means all have only a single fixed dimension.

10. Apparatus according to claim 7, wherein there are a plurality of said printing head assemblies;

the dimensions, as taken in a direction parallel to the movement of the armature as produced by said magnet means and said resilient means, being different among the plurality of said permanent magnet means and among said second yoke means of the plurality of printing head assemblies, and the corresponding dimensions of said bonding means being different from each other an amount to compensate for the first mentioned different dimensions so as to obtain a more accurate predetermined height for said first and second yoke means relative to said armature, for each assembly, than could be obtained if said bonding means all have only a single fixed dimension.

11. An assembly method of an armature actuating mechanism in a printing head comprising:

providing a first yoke having a core portion with a magnetic surface facing the armature;

forming an electro-magnet by setting coils around the core portion of said first yoke;

locating a permanent magnet adjacent the first yoke to attract the armature;

locating adjacent the permanent magnet a second yoke having a magnetic surface facing the armature;

providing a fluid bonding agent including magnetic particulate material therein;

applying said fluid bonding agent in gaps between opposite sides of the permanent magnet and the first and second yokes, respectively;

setting the relative positions of the magnetic surfaces of the core and the second yoke to a predetermined relationship by adjusting the gaps between the permanent magnet and the first and second yokes; and hardening said bonding agent while maintaining said predetermined relationship.

12. The assembhling method according to claim 11, further comprising said setting step contacting the magnetic surfaces of the core portion and the second yoke to the same level surface of a jig.

13. The assembling method according to claim 11 further comprising:

forming a wear resistant layer on a surface of the core portion; and forming a wear resistant layer on a surface of the second yoke facing to the armature.

14. The assembling method according to claim 11, wherein said providing a bonding agent step provides the magnetic material as a powder selected from the group consisting of iron, silicon steel, iron nickel alloy and iron cobalt alloy.

* * * * *